United States Patent [19]

Morita

[11] Patent Number: 5,392,215
[45] Date of Patent: Feb. 21, 1995

[54] AUTOMATIC CRUISING SPEED CONTROLLER FOR AN AUTOMOTIVE VEHICLE

[75] Inventor: Shigeki Morita, Himeji, Japan

[73] Assignee: Mitsubishi Denki Kabushiki Kaisha, Tokyo, Japan

[21] Appl. No.: 105,122

[22] Filed: Aug. 12, 1993

[30] Foreign Application Priority Data

Aug. 17, 1992 [JP] Japan .................. 4-217874
Aug. 18, 1992 [JP] Japan .................. 4-219338

[51] Int. Cl.6 ............................................. B60K 31/04
[52] U.S. Cl. ................... 364/426.04; 364/431.07; 123/352; 180/179
[58] Field of Search ........... 364/426.04, 431.07; 123/350, 352; 180/176, 177, 178, 179, 170

[56] References Cited

U.S. PATENT DOCUMENTS

| | | | |
|---|---|---|---|
| 4,829,438 | 5/1989 | Etoh | 364/426.04 |
| 4,833,612 | 5/1989 | Okuno et al. | 123/352 |
| 4,870,584 | 9/1989 | Etoh et al. | 364/426 |
| 4,922,428 | 5/1990 | Takahashi | 364/426.04 |
| 4,982,805 | 1/1991 | Naito et al. | 364/426.04 |
| 4,984,545 | 1/1991 | Kaneyasu et al. | 180/179 |
| 5,010,490 | 4/1991 | Naito et al. | 364/431.07 |
| 5,035,160 | 7/1991 | Morita | 74/866 |
| 5,048,631 | 9/1991 | Etoh | 180/179 |

FOREIGN PATENT DOCUMENTS 261545 11/1987 Japan .
292533 12/1987 Japan .

Primary Examiner—Gary Chin
Attorney, Agent, or Firm—Sughrue, Mion, Zinn, Macpeak & Seas

[57] ABSTRACT

An aromatic cruising speed controller for an automotive vehicle adjusts the throttle valve of the engine to perform the constant speed cruising control of the vehicle. A running resistance detector unit 18 calculates the running resistance R from the output torque T of the engine, the vehicle acceleration α, and the engine set-up condition including the gear ratio G. During the transient period immediately after the cruising control is commenced or resumed, the torque T0 of the engine which is necessary for attaining the target vehicle speed V0 is determined from the running resistance R, the gear ratio G, and the target throttle position is determined on the basis of this torque T0. Under the steady state, on the other hand, the throttle position is controlled in accordance with the proportional plus integral control method, such that the deviation ΔV of the vehicle speed V from the target vehicle speed V0 is reduced to zero. The drop or the overshoot of the vehicle speed during the transient period is thus suppressed. Alternatively, the proportional and the integral control gains of the throttle position are varied in accordance with the variation of the running resistance R. The response delay and the hunting of the vehicle speed under the uphill/downhill driving condition can thus be suppressed.

13 Claims, 13 Drawing Sheets

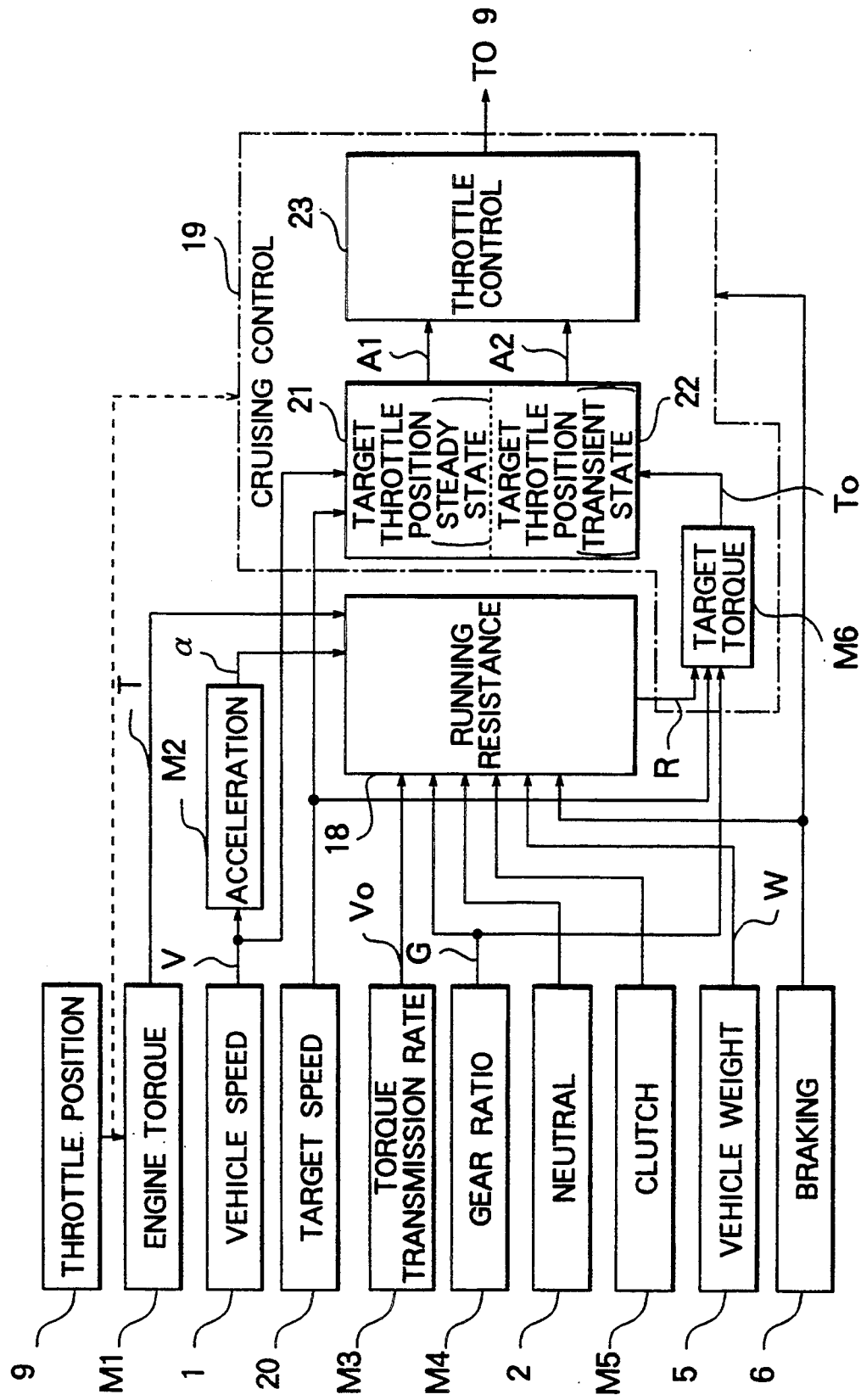

AUTOMATIC CRUISING SPEED CONTROLLER FOR AN AUTOMOTIVE VEHICLE

BACKGROUND OF THE INVENTION

This invention relates to automatic cruising speed controllers for automotive vehicles, by which the speed of the vehicle is automatically controlled to a target cruising speed in response to control switches such as the set-up switch and the resume switch. In particular, this invention relates to the automatic cruising speed controllers for automotive vehicles, by which the vehicle speed is controlled quickly to the target speed upon driver's operation of a control switch, such that the transient drop or overshoot of the vehicle speed is effectively suppressed. Further, this invention relates to the automatic cruising speed controllers for automotive vehicles, by which the hunting of the vehicle speed and the delay of the response resulting from the smaller than the normal or the larger than normal running resistance of the vehicle are effectively suppressed.

Automatic cruising speed controllers for automotive vehicles are well known by which the target cruising vehicle speed is set by means of a set-up switch, and, upon operation of a resume switch immediately after the acceleration or the deceleration of the vehicle, the vehicle speed is again automatically controlled to the target cruising speed.

For example, Japanese Laid-Open Patent (Kokai) No. 62-299436 discloses an automatic cruising speed controller by which the vehicle speed is controlled to a constant target speed by driving the throttle actuator coupled to the throttle valve, independently of the accelerator pedal operated by the driver of the vehicle. The control is performed in response to the vehicle speed signal and the control switches such as the target vehicle speed set-up switch.

However, in the case of the above conventional device, the throttle actuator is driven in response to the deviation of the actual vehicle speed from the target speed, or in response to the variation of the acceleration, and no special control is performed during the transient period immediately after the operation of the control switches. Namely, even during the transient period immediately after the operation of the control switches, the adjustment of the throttle valve begins only after the deviation of the actual vehicle speed from the target speed, or the variation of the acceleration, is detected. Thus, as shown at (a) in FIG. 13, during the transient period immediately after the set-up time t0, the vehicle speed V first drops deeply below the target speed V0, and returns thereto after a lapse of a substantial length of time. The stable vehicle speed is established thereafter. Further, as shown at (b) in FIG. 13, a substantial length of time elapses before the throttle position (opening degree) A is stabilized to the throttle position A0 corresponding to the target cruising speed V0. The overshoot of the throttle position (opening degree) A immediately after the set-up time t0 gives rise to an abrupt variation of the acceleration of the vehicle, which gives the driver an uncomfortable feeling. Similar problem arises when the constant speed cruising is temporarily suspended upon emergency braking, etc., and the cruising at the previous constant target speed V0 is resumed thereafter.

The conventional automatic cruising speed controller thus has the following disadvantage. Since the target throttle position (opening degree) of the throttle valve is adjusted in response to the deviation of the actual vehicle speed from the target speed, or in response to the variation of the acceleration of the vehicle, the vehicle speed drops or overshoots during the transient period immediately after the set-up of the target vehicle speed or immediately after the cruising control is resumed. This gives the driver an uncomfortable feeling of deceleration and acceleration.

Further, according to the conventional automatic cruising speed controller, the control gain is set at a constant level corresponding to the flat land driving condition, even when the vehicle is running uphill or downhill. Thus, the conventional automatic cruising speed controller has the following further disadvantage. When the vehicle is running uphill, the control gain is set at a value smaller than the optimum level. As a result, the response is delayed. On the other hand, when the vehicle is running downhill, the control gain is set at a too great value, such that the hunting of the vehicle speed may result. In both cases, the driver's comfort is disturbed.

SUMMARY OF THE INVENTION

It is therefore an object of this invention to provide an automatic cruising speed controller by which the transient response characteristic immediately after the set-up and the resuming of the constant speed cruising control is improved such that the drop and the overshoot of the vehicle speed during the transient periods are effectively suppressed.

A further object of this invention is to provide an automatic cruising speed controller by which the response delay or the hunting of the vehicle speed is effectively suppressed even when the vehicle is running uphill or downhill.

The first object is accomplished in accordance with the first aspect of this invention by an automatic cruising speed controller for an automotive vehicle which comprises: a vehicle speed detector means for detecting a current speed of the vehicle; a target vehicle speed set-up means for setting a target vehicle speed; a first target throttle position calculator means, coupled to the vehicle speed detector means and the target vehicle speed set-up means, for determining a first target throttle position for attaining the target vehicle speed during a steady state period, on the basis of the vehicle speed detected by the vehicle speed detector means and the target vehicle speed set by the target vehicle speed set-up means; a running resistance detector means for determining a running resistance of the vehicle; an engine set-up condition detector means for detecting an engine set-up condition including a gear ratio of a transmission inserted between an output shaft of the engine and road wheels of the vehicle; a target torque determination means, coupled to the running resistance detector means and the engine set-up condition detector means, for determining a target torque of the engine necessary for attaining the target vehicle speed during a transient period immediately after the constant speed cruising control of the vehicle is commenced or resumed, on the basis of the running resistance determined by the running resistance detector means and the gear ratio detected by the engine set-up condition detector means; a second target throttle position calculator means, coupled to the target torque determination means, for determining a second target throttle position for attaining the target vehicle speed during the transient period immediately after the constant speed cruising control of the vehicle is commenced or resumed, on the basis of the target torque determined by the target torque determination means; and a throttle control means, coupled to the first and second target throttle position calculator means, for adjusting the throttle position to the second target throttle position during the transient period immediately after the constant speed cruising control of the vehicle is commenced or resumed, and to the first target throttle position during a steady state after the transient period. It is preferred that the first target throttle position calculator means calculates the first target throttle position on the basis of the detected and the target vehicle speed in accordance with the proportional plus integral control method.

The second object is accomplished by an automatic cruising speed controller according to the second aspect of this invention, which comprises: a vehicle speed detector means for detecting a current speed of the vehicle; a target vehicle speed set-up means for setting a target vehicle speed; running resistance detector means for determining a running resistance of the vehicle; a control gain calculation means, coupled to the running resistance detector means, for determining a control gain of the throttle position corresponding to the running resistance determined by the running resistance detector means; a target throttle position calculator means, coupled to the vehicle speed detector means, the target vehicle speed set-up means, and the control gain calculation means, for determining a target throttle position for attaining the target vehicle speed, on the basis of the vehicle speed detected by the vehicle speed detector means, the target vehicle speed set by the target vehicle speed set-up means, and the control gain determined by the control gain calculation means; and throttle control means, coupled to the target throttle position calculator means, for adjusting the throttle position to the target throttle position. Preferably, the control gain calculation means calculates a proportional gain and an integral gain corresponding to the running resistance; and the target throttle position calculator means calculates the target throttle position on the basis of the detected vehicle speed, the target vehicle speed, and the proportional and the integral control gains, in accordance with a proportional plus integral control method.

It is preferred in both the first and the second aspect of this invention that the running resistance detector means comprises: engine torque detector means for detecting an output torque of the engine of the vehicle; acceleration detector means, coupled to the vehicle speed detector means, for determining an acceleration of the vehicle from successive values of vehicle speed detected by the vehicle speed detector means; engine set-up condition detector means for detecting an engine condition including a gear ratio of a transmission coupled to an output shaft of the engine; and calculation means, coupled to the engine torque detector means, the acceleration detector means, and the engine set-up condition detector means, for calculating a running resistance on the basis of the engine torque, the acceleration, and the engine set-up condition.

Further, it is preferred that the constant speed cruising control is commenced or resumed in response to an operation of a control switch. Namely, the constant speed cruising control is commenced in response to an operation of a set-up switch and resumed in response to an operation of a resume switch. Further preferably, the target vehicle speed set-up means determines as the target vehicle speed the vehicle speed detected by the vehicle speed detector means upon the driver's operation of the set-up switch.

It is also preferred that the throttle control means comprises: a throttle position sensor means for detecting the throttle position; and a throttle actuator means for adjusting the throttle position; the throttle control means controlling the throttle actuator means such that a throttle position detected by the throttle position sensor means agrees with the target throttle position.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 2 is a block diagram showing the functional structure of the running resistance detector unit 18 and the cruising control unit 19 of FIG. 1;

Figure 1:
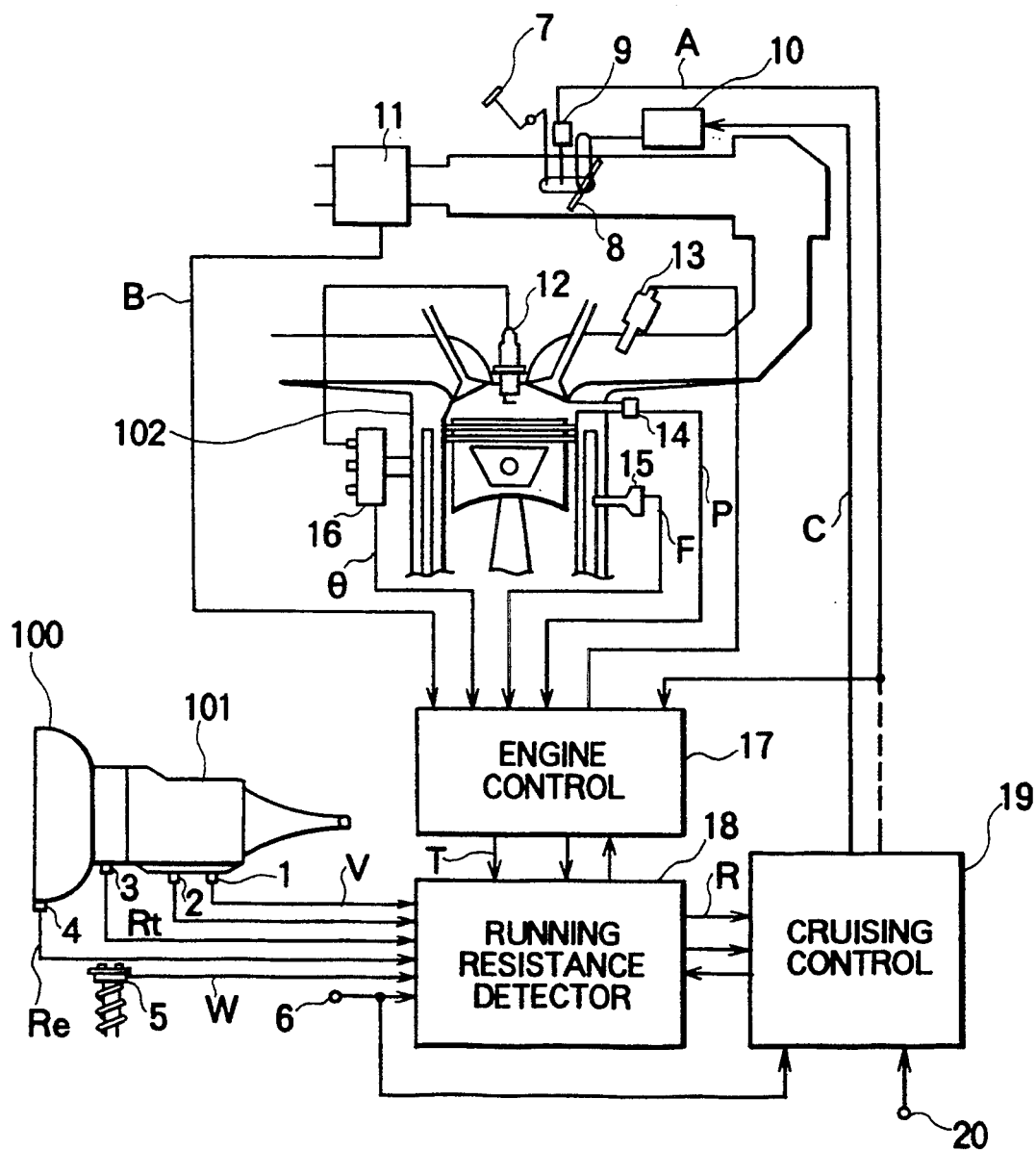
FIG. 1 is a block diagram showing the overall structure of an automatic cruising speed controller according to this invention.
Figure 13:
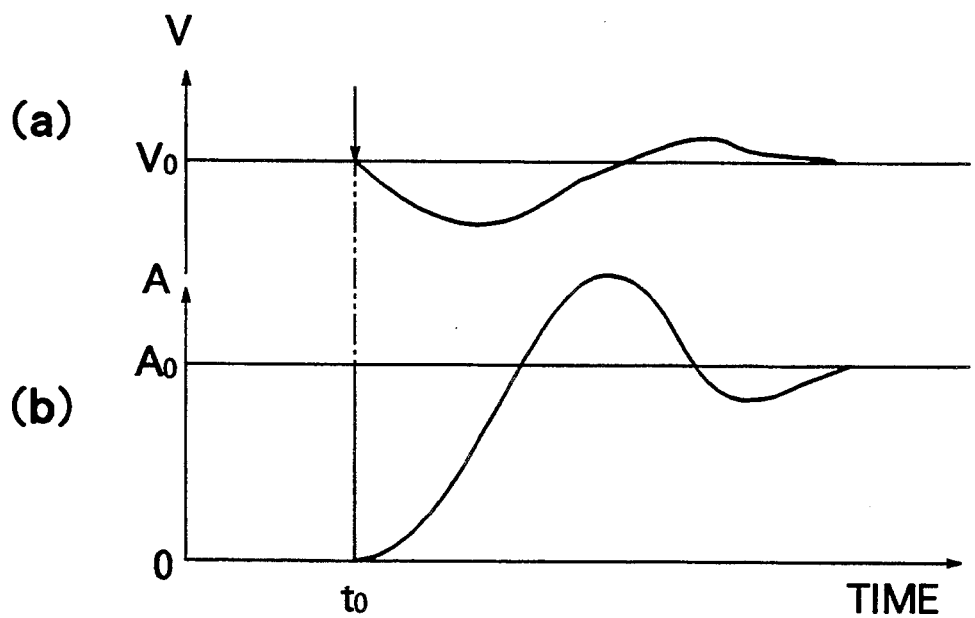
Figure 14:
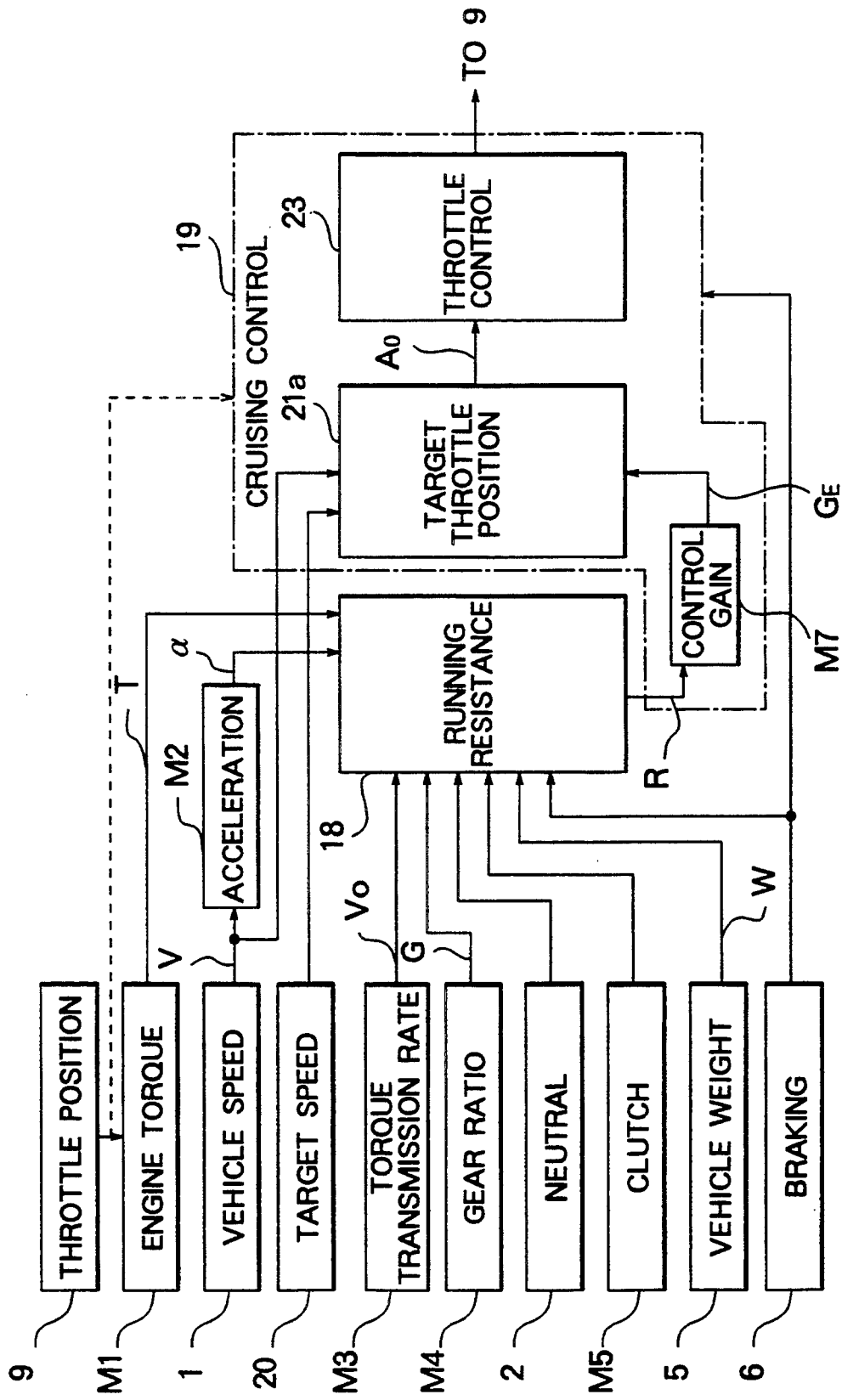
Figure 15:
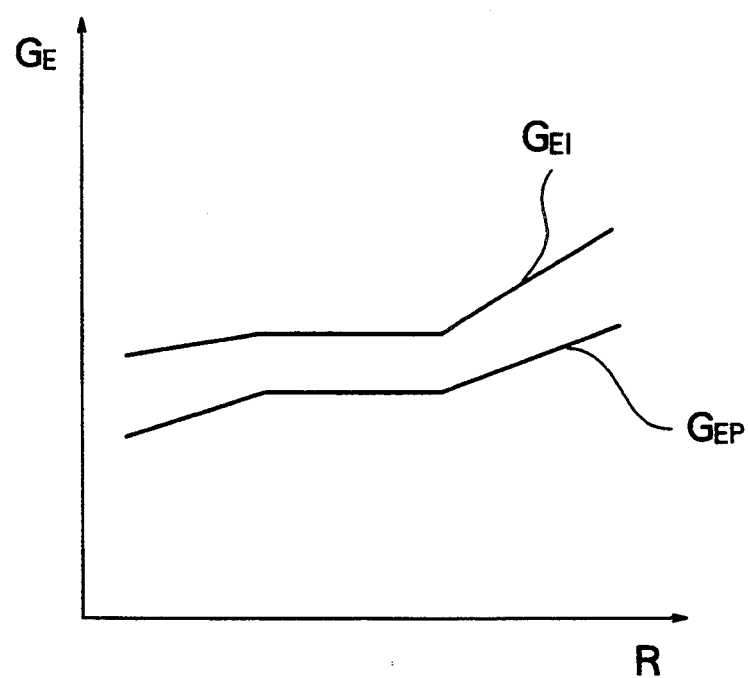
Figure 16:
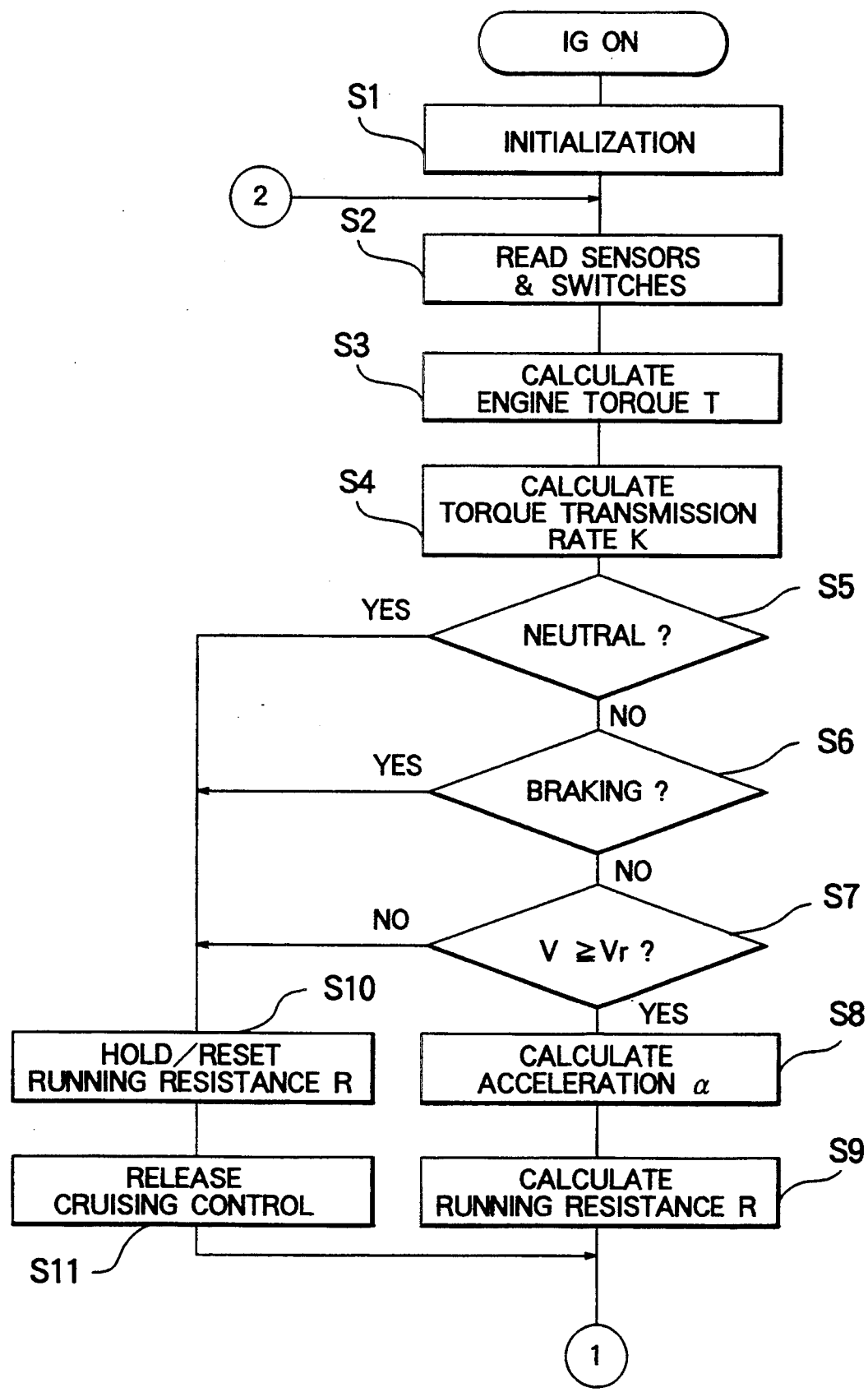
Figure 17:
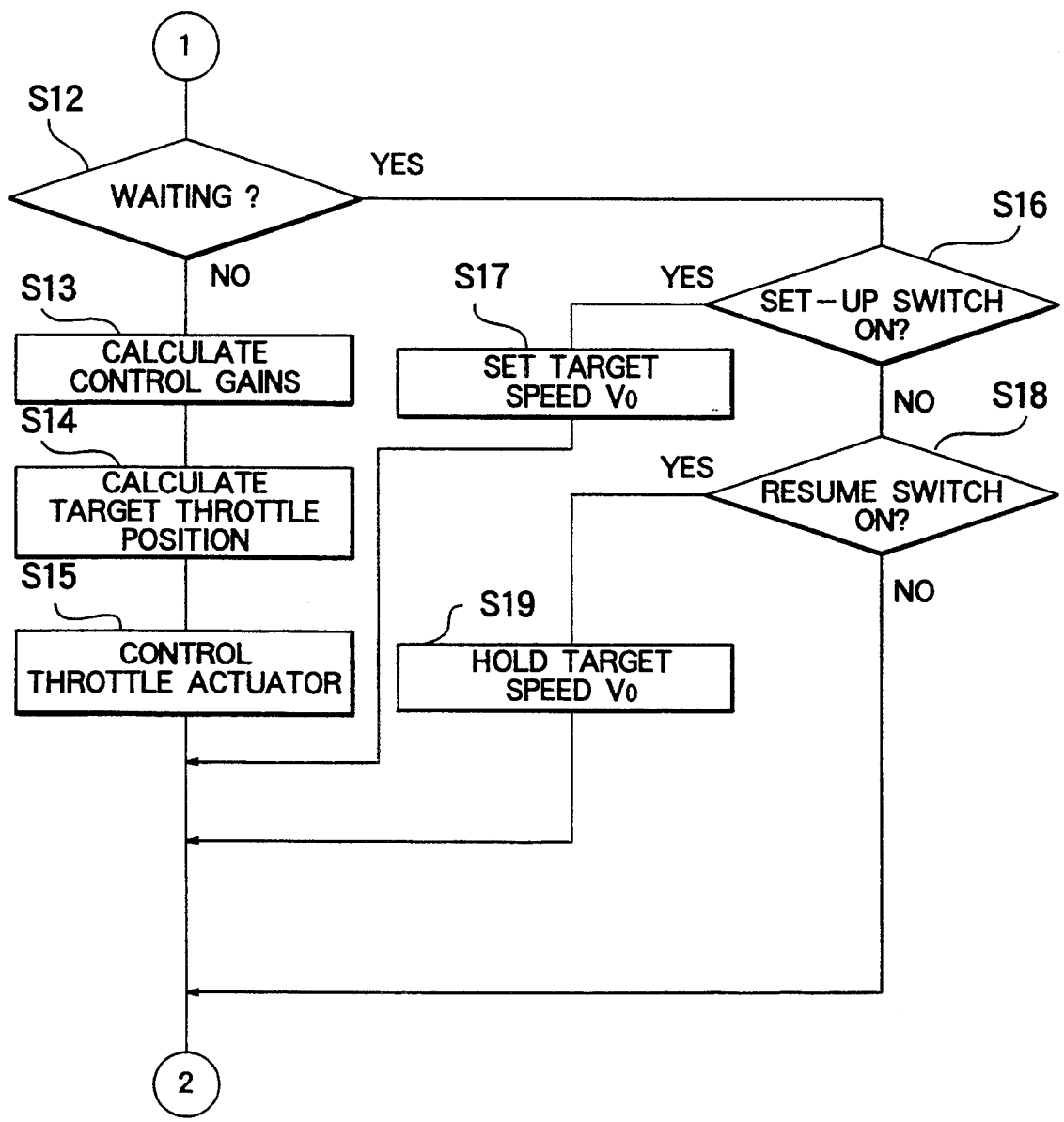

(1) the transient state control based on the value of running resistance R is performed according to this invention (the solid curves), and (2) no transient state control is performed (the dotted curves);

FIG. 13 is a diagram showing the variation of the vehicle speed V and the throttle position (opening degree) A immediately after the cruising control is set up in the case of the conventional automatic cruising speed controller;

FIG. 14 is a block diagram showing alternative functional structure of the running resistance detector unit and the cruising control unit of FIG. 1 according to the second embodiment of this invention;

FIG. 15 is a characteristic diagram showing the variations of the integral control gain GEI and the proportional control gain GEP, used in the second embodiment, with respect to the running resistance R of the vehicle;

FIG. 16 is a flowchart showing a part of the routine for performing the cruising control according to the second embodiment of this invention; and FIG. 17 shows the remaining part of the routine of FIG. 16.

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

FIG. 1 is a block diagram showing the overall structure of an automatic cruising speed controller according to this invention. A vehicle speed sensor 1 mounted upon the output shaft of the torque converter 100 (the shaft which drives the road wheels of the vehicle through the final reduction gears, etc.) detects the rpm of the output shaft of the transmission 101 corresponding to the current vehicle speed V. An inhibitor switch 2 detects the neutral state of the transmission 101. A torque converter turbine rpm sensor 3 detects the rpm Rt of the output shaft of the torque converter 100. The torque converter 100 includes a pump for driving a turbine through a working fluid, thereby generating the torque of the output shaft of the torque converter 100 coupled to the turbine thereof. An engine rpm sensor 4 detects the rpm Re of the input shaft of the torque converter 100 (the rpm of the output shaft of the engine which drives the pump of the torque converter 100). A vehicle weight sensor 5 detects the vehicle weight W. A brake switch 6 detects whether or not the brake pedal is pressed. The torque generated by the engine is transmitted through the torque converter 100, and, with a predetermined gear ratio, through the transmission 101. The sensors 1, 3, 4 mounted upon the transmission 101 and the torque converter 100 for detecting the vehicle speed V, the rpm Rt of the output shaft of the torque converter 100, and the rpm Re of the engine, respectively, may consist of a pulse generator, and possibly be provided with an appropriate low-pass filter for suppressing detection variations.

An acceleration pedal 7 is pressed by the driver of the vehicle to move the throttle valve 8. The throttle position (opening degree) A of the throttle valve 8 is detected by a throttle position sensor 9. When the cruising control is performed, a throttle actuator 10 adjusts the throttle valve 8 under the control of a cruising control unit 19. An air flow sensor 11 detects the amount of air intake B through the air intake passage, which is adjusted by the throttle position (opening degree) A of the throttle valve 8. An ignition plug 12 disposed at the top of a cylinder 102 of the engine ignites the fuel which is injected by a fuel injector 13 into the air intake passage upstream of the cylinder 102. A cylinder pressure sensor 14 detects the cylinder inner pressure P of the cylinder 102 and a water temperature sensor 15 detects the water temperature F contained in the jacket of the cylinder 102. A crankshaft angle sensor 16 generates crankshaft angle signal $\theta$ in synchronism with the rotation of crankshaft of the engine.

An engine control unit 17 for controlling the engine in response to the throttle position (opening degree) A, the cylinder inner pressure P, the air intake B, the water temperature F, and the crankshaft angle signal $\theta$, includes an engine torque detector means for detecting the output torque T of the engine as described below. A running resistance detector unit 18 detects the running resistance R on the basis of the output torque T, the vehicle acceleration $\alpha$ determined from the vehicle speed V, and the various set-up conditions of the engine. A cruising control unit 19 controls the throttle position (opening degree) A by driving the throttle actuator 10. The control switches 20 include: the set-up switch for setting the target vehicle speed and commencing the cruising control, a resume switch for resuming the cruising control after a temporary suspension thereof, a cancel switch for cancelling the cruising control, etc.

The cruising control unit 19 generates the throttle control signal C for the throttle actuator 10 in response to the running resistance R from the running resistance detector unit 18 and the target vehicle speed set-up signal from the control switches 20, etc., and halts the cruising control upon detecting an emergency braking. Since the cruising control unit 19 controls the throttle valve 8 by means of the open loop control method, the actual throttle position (opening degree) A need not be fed back to the cruising control unit 19. When desired, however, the throttle position (opening degree) A from the throttle position sensor 9 may be fed back to the cruising control unit 19 to perform the feedback control of the throttle actuator 10.

Sensors and detectors for supplying various parameters of the engine and the vehicle state include: the vehicle speed sensor 1, the inhibitor switch 2, the vehicle weight sensor 5, the brake switch 6, the throttle position sensor 9, and the set-up switch for setting the target vehicle speed of the control switches 20, as shown in FIG. 1. An engine torque detector means M1 of the engine control unit 17, as shown in FIG. 2, calculates the output torque T of the engine on the basis of, for example, the throttle position (opening degree) A supplied from the throttle position sensor 9, etc.

FIGS. 3a through 3d show implementations of the engine torque detector means M1. According to the structure of FIG. 3a, the output torque T of the engine is determined on the basis of the cylinder inner pressure P supplied from the cylinder pressure sensor 14 and the crankshaft angle signal $\theta$ supplied from the crankshaft angle sensor 16. According to the structure of FIG. 3b, the output torque T is determined on the basis of the air intake B supplied from the air flow sensor 11 and the rpm Re of the engine supplied from the engine rpm sensor 4. According to the structure of FIG. 3c, the output torque T is determined on the basis of the throttle position (opening degree) A supplied from the throttle position sensor 9 and the rpm Re of the engine supplied from the engine rpm sensor 4. According to the structure of FIG. 3d, the output torque T is determined on the basis of the manifold pressure PM supplied from the manifold pressure sensor M and the rpm Re supplied from the engine rpm sensor 4.

Figure 3A:
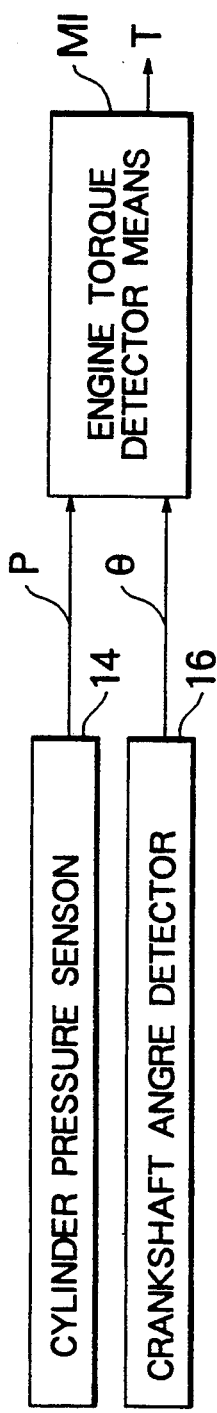
FIG. 3a is a block diagram showing an implementation of the engine torque detector means M1.

According to the structure of FIG. 3a, the output torque T of the engine is determined on the basis of the cylinder inner pressure P and the crankshaft angle signal $\theta$ as follows. The indicated mean effective pressure Pi is calculated from the cylinder pressure at nth crankshaft angle Pn (for example, if the crankshaft angle is counted in units of 2 degrees, Pn represents the cylinder inner pressure P at the crankshaft angle 2n, where n ranges from 1 to 180), the cylinder capacity Y, and the change $\Delta Y$ of the cylinder capacity per unit angle (e.g., 2 degrees), using the following equation (1):

$$Pi = \Sigma(Pn \times \Delta Y)/Y \tag{1}$$

where the summation is taken over all values of n (e.g., from 1 to 180, such that the angle 2n ranges from 2 to 360 degrees). The indicated mean torque Ti is calculated from the indicated mean effective pressure Pi and the cylinder capacity Y using the following equation (2):

$$Ti = 10 \times Y \times Pi/(4\pi) \tag{2}$$

The indicated mean effective pressure Pi is the value corresponding to the area enclosed by the curve representing the cylinder inner pressure P upon the plane of the indicator diagram (pressure-volume diagram). The indicated mean torque Ti corresponds to the total torque generated by the explosion of the cylinder 102. The net torque Te which is actually produced is calculated from the indicated mean torque Ti as given by equation (2) and the friction torque Tf, using the following equation (3):

$$Te = Ti - Tf \tag{3}$$

Figure 3B:
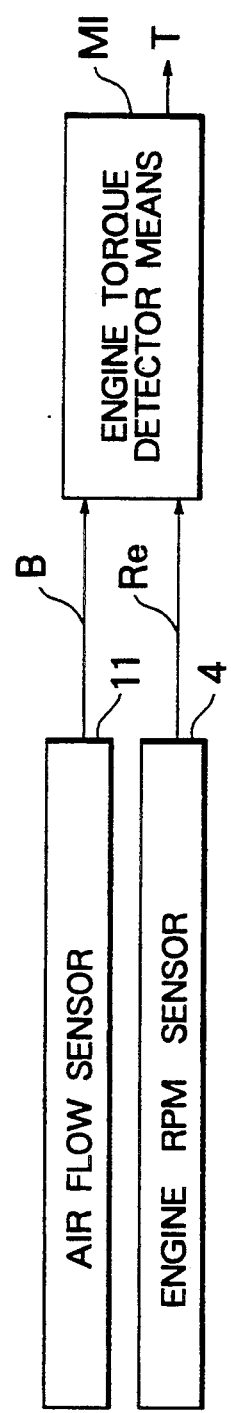
FIG. 3b is a block diagram showing alternative implementation of the engine torque detector means M1.

On the other hand, according to the structure of FIG. 3b, the output torque T of the engine is determined from the air intake B and the rpm Re of the engine as follows. First, the charging efficiency CE of the cylinder is calculated from the air intake B and the rpm Re of the engine by means of the following equation (4):

$$CE = B/Re \tag{4}$$

Figure 4:
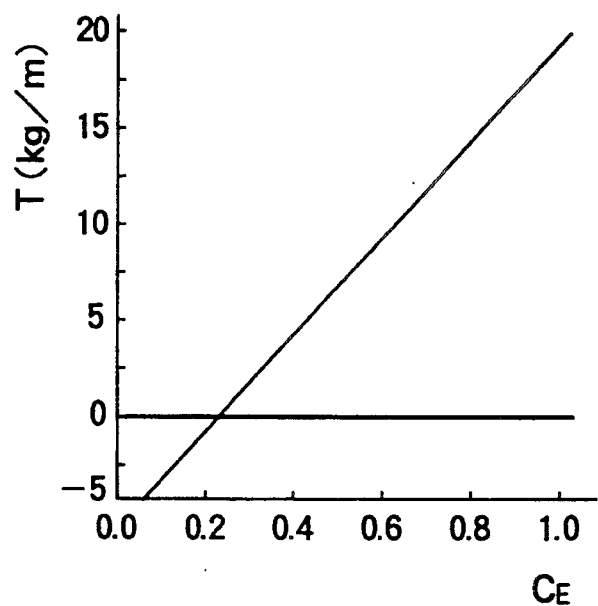
FIG. 4 is a characteristic diagram showing the relationship between the charging efficiency CE and the output torque T of the engine.

FIG. 4 is a characteristic diagram showing the relationship between the charging efficiency CE and the output torque T of the engine. A table showing the relationship of FIG. 4 is stored in a memory (e.g., a ROM) forming part of the engine torque detector means M1. Thus, looking up the table, the output torque T is determined from the value of the charging efficiency CE.

Figure 3C:
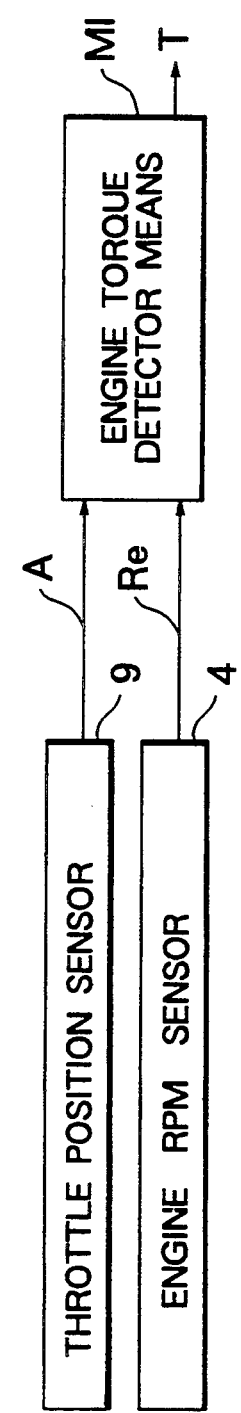
FIG. 3c is a block diagram showing another alternative implementation of the engine torque detector means M1.

According to the structure of FIG. 3c, the output torque T is determined from the throttle position (opening degree) A and the rpm Re of the engine as follows.

Figure 5:
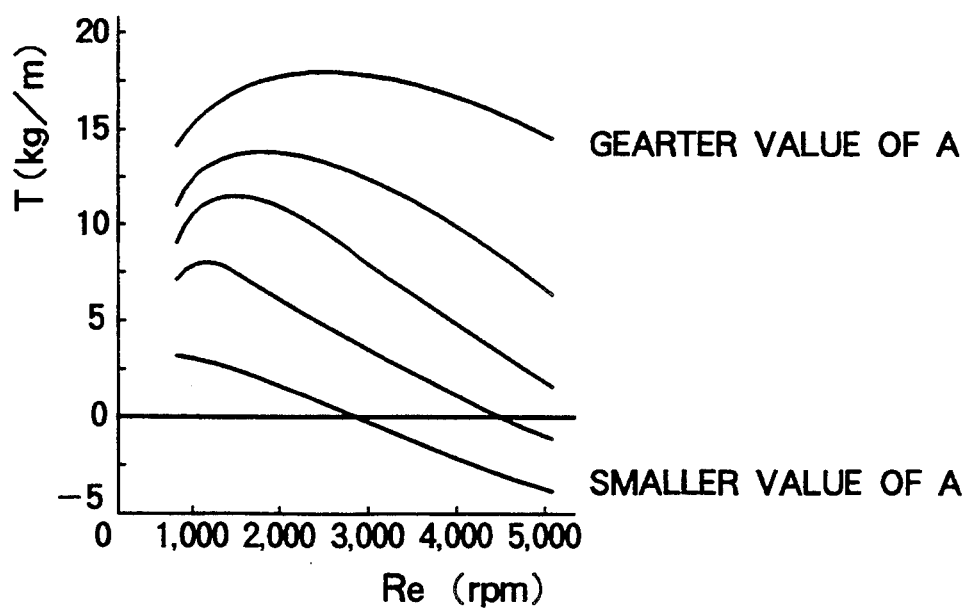
FIG. 5 is a characteristic diagram showing the relationship between the rpm Re and the output torque T of the engine for various throttle positions.

FIG. 5 is a characteristic diagram showing the relationship between the rpm Re and the output torque T of the engine for various throttle positions. The output torque T is a function of rpm Re and the throttle position (opening degree) A. The curves in FIG. 5 represents the relationships between the rpm Re and the output torque T for respective values of the throttle position (opening degree) A. As shown in the figure, the value of output torque T increases as the throttle position (opening degree) A increases. The values of the output torque T as dependent upon the values of the rpm Re and the throttle position (opening degree) A are stored as a two-dimensional map in the memory forming part of the engine torque detector means M1. Thus, looking up the map, the output torque T is directly determined from the rpm Re and the throttle position (opening degree) A.

Figure 3D:
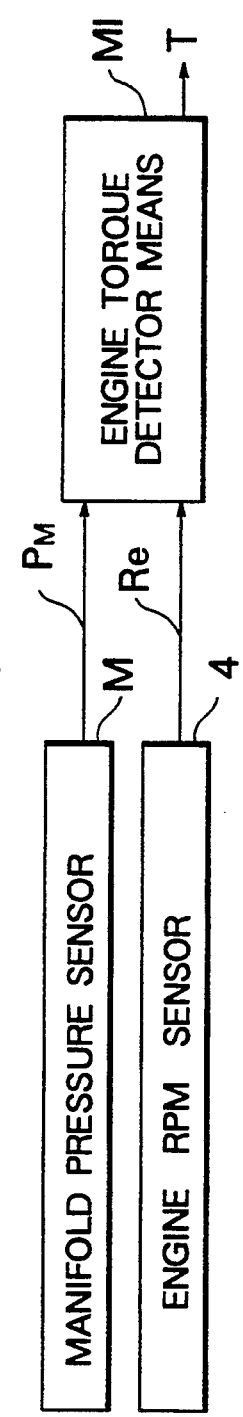
FIG. 3d is a block diagram showing still another alternative implementation of the engine torque detector means M1.
Figure 6:
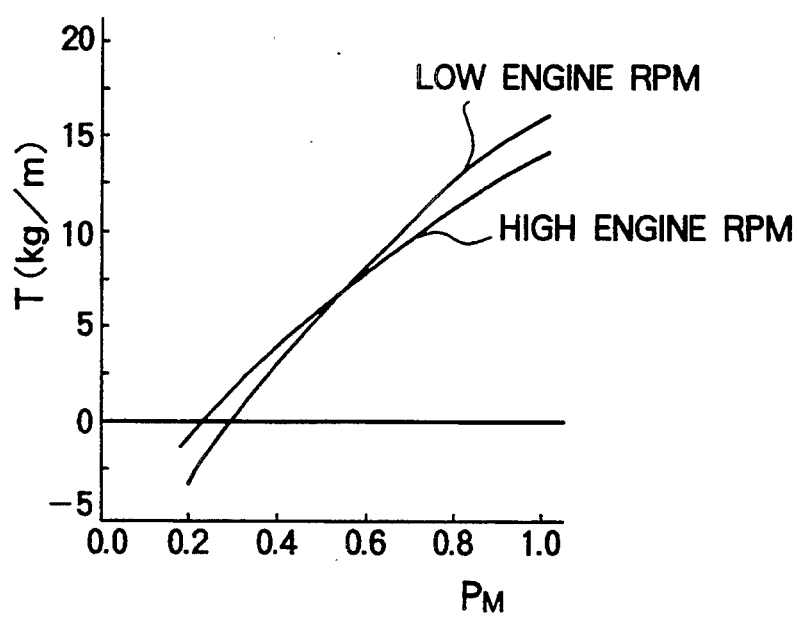
FIG. 6 is a characteristic diagram showing the relationship between the manifold pressure PM and the output torque T for a high and a low rpm of the engine.

According to the structure of FIG. 3d, the output torque T is determined from the manifold pressure PM and the rpm Re of the engine as follows. FIG. 6 is a characteristic diagram showing the relationship between the manifold pressure PM and the output torque T for a high and a low rpm of the engine. The output torque T is thus a function of manifold pressure PM and the rpm Re, and the two curves in FIG. 6 show the relationships between the manifold pressure PM and the output torque T for respective rpm Re. The values of the output torque T as dependent upon the values of the manifold pressure PM and the rpm Re are stored as a map in the memory forming part of the engine torque detector means M1. Thus, looking up the map, the output torque T is determined directly from the manifold pressure PM and the rpm Re.

Figure 7:
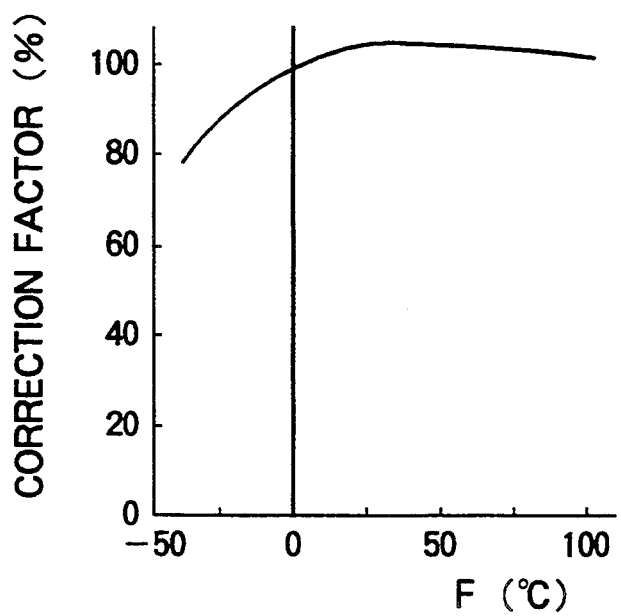
FIG. 7 shows the relationship between the water temperature F of the cylinder jacket of the engine and the correction factor for the output torque T.

By the way, the value of friction torque Tf, etc., which have influence upon the value of the output torque T as determined above, depend on the value of the water temperature F. Thus, the output torque T as obtained by the structures of FIGS. 3a through 3d should be multiplied by a correction factor. FIG. 7 shows the relationship between the water temperature F of the cylinder jacket of the engine and the correction factor for the output torque T. A table showing the relationship of FIG. 7 is stored in the memory forming part of the engine torque detector means M1. Looking up the table, the correction factor corresponding to the water temperature F is determined, and the output torque T as obtained by one of the above methods is multiplied by the correction factor, to obtain the corrected value of the output torque T.

An acceleration detector means M2 of the running resistance detector unit 18 detects the vehicle acceleration $\alpha$ from the vehicle speed V. The acceleration detector means M2 determines the vehicle acceleration $\alpha$ of the vehicle from the difference between the current vehicle speed V(i) and the previous vehicle speed V(i−1). For example, the increment V(i)−V(i−1) of the vehicle speed V during a predetermined short interval (e.g., from 0.1 to 2 seconds) is used as the value of the vehicle acceleration $\alpha$. For the purpose of reducing the variation of the detection value of the vehicle acceleration $\alpha$, an appropriate low-pass filter may be used.

The control switches 20 include the set-up switch for beginning the cruising control and setting the target vehicle speed. In response to the output signal from the set-up switch, the cruising control unit 19 sets the cruising target vehicle speed V0.

The torque transmission rate determination means M3, which must be provided in the case of a vehicle with an automatic transmission as shown in FIG. 1, includes the torque converter turbine rpm sensor 3 and the engine rpm sensor 4. In response to the output signals from the torque converter turbine rpm sensor 3 and the engine rpm sensor 4, the torque transmission rate determination means M3 first calculates the output/input rpm ratio of the torque converter 100. The output/input rpm ratio represents the slip between the input and the output shafts of the torque converter 100. Further, the torque transmission rate determination means M3 calculates the torque transmission rate K from the output/input rpm ratio of the torque converter 100 as described below.

Figure 8:
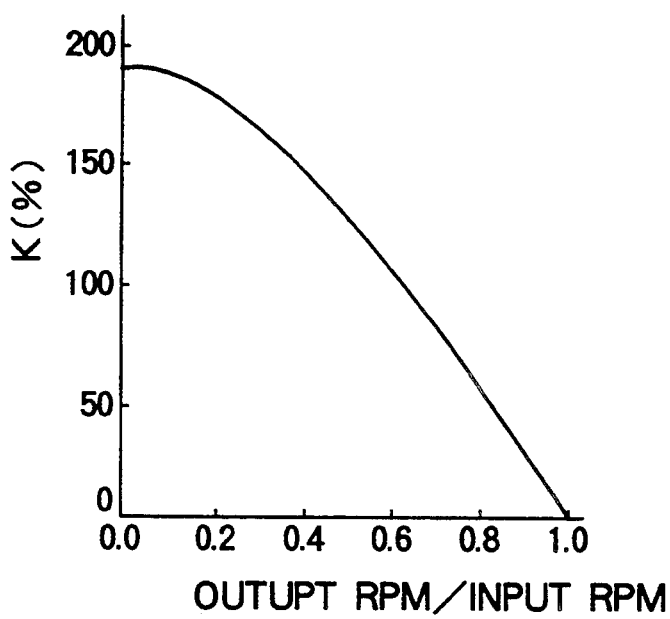
FIG. 8 is a characteristic diagram showing the relationship between the input/output rpm ratio of the torque converter and the torque transmission rate K.

FIG. 8 is a characteristic diagram showing the relationship between the input/output rpm ratio of the torque converter and the torque transmission rate K. The input and output shafts of the torque converter 100 are usually coupled via a working fluid driven by a pump, and the torque of the input shaft is transmitted to the output shaft through the fluid. Under this circumstance, when there is no slip between the input and the output shafts (i.e., the input rpm and the output rpm are equal, namely (output rpm)/(input rpm)=1), no torque is transmitted through the torque converter 100 (i.e., torque transmission rate K=0). As the slip increases (namely, as the output/input rpm ratio decreases), the torque transmission rate K increases, and the maximum value of K, 190 percent, is reached when the output shaft is stationary (i.e., output/input rpm ratio is equal to 0). The output torque of the engine multiplied by the torque transmission rate K is transmitted to the output torque of the torque converter 100. In FIG. 8, the curve representing the torque transmission rate K falls from 190 percent to 0 as the output/input rpm ratio increases from 0 to 1. Under a stable driving condition, however, the input and the output shafts of the torque converter 100 may be mechanically engaged by means of a lock-up clutch to minimize the energy loss. Then, the input and the output shafts rotate at the same speed (i.e., output/input rpm ratio is equal to 1) and the torque transmission rate K is 100 percent.

A table representing the relationship shown in FIG. 8 is stored in the memory forming part of the torque transmission rate determination means M3. When the lock-up clutch of the torque converter 100 is not engaged and the input and the output shafts are thus coupled via the fluid driven by a pump, there is a slip between the input and the output shafts of the torque converter 100. The torque transmission rate determination means M3 thus determines the torque transmission rate K by first calculating the output/input rpm ratio as described above, and then by looking up the table showing the relation of FIG. 8. When the torque converter 100 is locked up, however, the input and the output shafts of the torque converter 100 are mechanically engaged by the lock-up clutch, there is no slip between the input and the output shafts of the torque converter 100. Then, the torque transmission rate K is 100 percent.

The gear ratio detector means M4 includes the vehicle speed sensor 1 (which detects the rpm of the output shaft of the transmission 101) and the torque converter turbine rpm sensor 3 (which detects the rpm of the input shaft of the transmission 101). Namely, in the case of the automatic transmission shown in FIG. 1, the gear ratio G is determined as the ratio of the rpm Rt of the turbine of the torque converter 100 (detected by the torque converter turbine rpm sensor 3) and the rpm of the output shaft of the transmission 101 (detected by the vehicle speed sensor 1). Alternatively, the gear ratio detector means M4 may determine the gear ratio G from the gear position data of the transmission 101. Further, in the case of the manual transmission, the gear ratio G is determined as the ratio of the rpm of the output shaft of the clutch (or the rpm Re of the engine when the clutch is engaged) and the rpm of the output shaft of the transmission (which corresponds to the vehicle speed V).

The inhibitor switch 2 detects the neutral state of the transmission. A neutral switch may be used as the neutral state detector means instead of the inhibitor switch 2. A clutch detector means M5, consisting, for example, of a clutch switch, is provided in the case where the manual transmission vehicle. The clutch detector means M5 detects the engagement/disengagement state of the clutch of the manual transmission. The vehicle weight sensor 5 for detecting the vehicle weight W is needed in the case of a vehicle with a greatly changing weight, e.g., a vehicle such as a truck for transporting heavy loads. The vehicle weight sensor 5 may be made of load cells mounted upon the suspension of the vehicle. The brake switch 6, controlling the current supply to the braking lamp, detects whether or not the brake pedal is kicked.

The torque transmission rate determination means M3, the gear ratio detector means M4, the inhibitor switch 2 (detecting the neutral state of the transmission), the clutch detector means M5 (in the case of the manual transmission type vehicle), the vehicle weight sensor 5, the brake switch 6, and the throttle position sensor 9 constitute the engine set-up condition detector means for detecting the set-up condition of the engine. The running resistance detector unit 18 calculates the running resistance R on the basis of the engine set-up condition (including the gear ratio G) as determined by the engine set-up condition detector means including the gear ratio detector means MM4. The calculation of the running resistance R is performed using the equation (9) as described below.

Activated in response to the driver's operation of the target vehicle speed set-up switch included in the control switches 20, the target torque calculator means M6 calculates the target torque T0 for the transient period on the basis of the vehicle speed V and the gear ratio G. Namely, the target torque calculator means M6 calculates as the value of the target torque T0 the output torque of the engine at which the vehicle runs at the target cruising speed and hence the vehicle acceleration α vanishes. The target torque T0, or the torque of the engine needed for the constant speed cruising, is calculated from the running resistance R, the gear ratio G (including the last reduction gear ratio), and the radius r of the road wheels of the vehicle, using the following equation (5):

$$T0 = R/(G \times 1/r) \tag{5}$$

On the basis of the target torque T0 supplied from the target torque calculator means M6, a second target throttle position calculator means 22 determines the target throttle position (opening degree) A2 for attaining the cruising speed during the transient period immediately after the driver's operation of the set-up switch of the control switches 20 by which the target vehicle speed is set. On the other hand, on the basis of the deviation Δ V of the vehicle speed V from the target speed V0, a first target throttle position calculator means 21 determines the target throttle position (opening degree) A1 for the constant speed cruising during the steady state. The first and the second target throttle position calculator means 21 and 22 are selectively activated depending on whether the vehicle is in the steady or the transient state, and generates either the target throttle position (opening degree) A1 or the target throttle position (opening degree) A2.

On the basis of the vehicle speed V supplied from the vehicle speed sensor 1 and the target speed V0 supplied from the set-up switch of the control switches 20, the first target throttle position calculator means 21 calculates the steady state target throttle position (opening degree) A1 in accordance with the proportional plus integral control method as follows.

First, the deviation $\Delta V$ of the actual vehicle speed V from the target speed V0 for each predetermined period (i.e., the integral or accumulated error $\epsilon I$) is calculated by the following equation (6):

$$\Delta V = \epsilon I = V0 - V \qquad (6)$$

Further, the difference $\Delta V(i)$ between the current vehicle speed $V(i)$ and the previous vehicle speed $V(i-1)$ just one predetermined period before the current period (namely, the proportional error $\epsilon P$) is determined by the following equation (7):

$$\Delta V(i) = \epsilon P = V(i-1) - V(i) \qquad (7)$$

Next, using the integral error $\epsilon I$ and the proportional error $\epsilon P$ obtained from the above equations (6) and (7), respectively, and the control gain constants KI and KP, the variation of the throttle position $\Delta A$ needed for adjusting the the vehicle speed V to the target speed V0 is determined by the following equation (8):

$$\Delta A = JKI \times \epsilon I + KP \times \epsilon P \qquad (8)$$

The first target throttle position calculator means 21 adds the variation of the throttle position $\Delta A$ obtained from equation (8) to the current throttle position (opening degree) A detected by the throttle position sensor 9, thereby obtaining the target throttle position (opening degree) A1 for the steady state.

Figure 9:
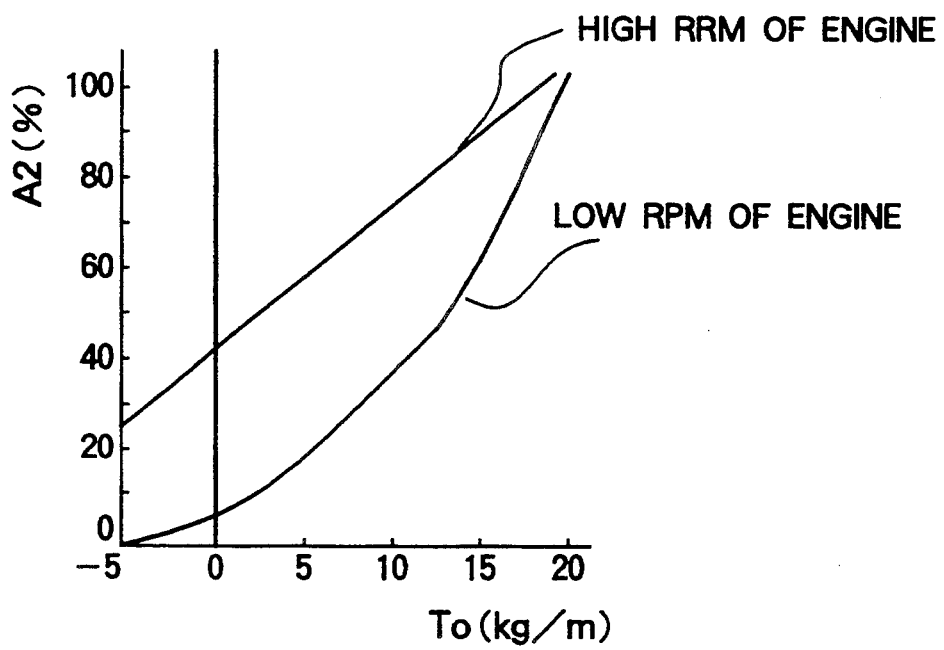
FIG. 9 is a characteristic diagram showing the relationship between the transient target throttle position (opening degree) A2 and the target torque T0 for a high and a low rpm of the engine.

On the other hand, during the transient period immediately after the set-up or the resuming operation, the second target throttle position calculator means 22 calculates the target throttle position (opening degree) A2 as the target throttle position necessary for generating the target torque T0. FIG. 9 is a characteristic diagram showing the relationship between the transient target throttle position (opening degree) A2 and the target torque T0 for a high and a low rpm of the engine. The target throttle position (opening degree) A2 is dependent upon of the target torque T0 and the rpm Re of the engine as shown in FIG. 9. By looking up the map in the memory showing this dependence, the second target throttle position calculator means 22 determines the target throttle position (opening degree) A2 from the target torque T0 and the rpm Re of the engine, when the vehicle is in the transient state.

The throttle control means 23 (see FIG. 2), consisting of an electric throttle actuator, controls the position of the throttle valve 8 in accordance with the target throttle position (opening degree) A1 or A2, according as the vehicle is in the steady or the transient state. Further, in response to the brake signal from the brake switch 6, etc., the throttle control means 23 releases the cruising control of the throttle valve 8. The throttle control means 23 controls the throttle position (opening degree) A of the throttle valve 8 in accordance with the first target throttle position (opening degree) A1 during the steady state, and in accordance with the second target throttle position (opening degree) A2 during the transient state. The throttle position (opening degree) A may be fed back to the throttle control means 23 to perform the feedback control of the throttle position (opening degree) A. The target torque calculator means M6, the first and second target throttle position calculator means 21 and 22, and the throttle control means 23 constitute the cruising control unit 19 of FIG. 1.

Figure 10:
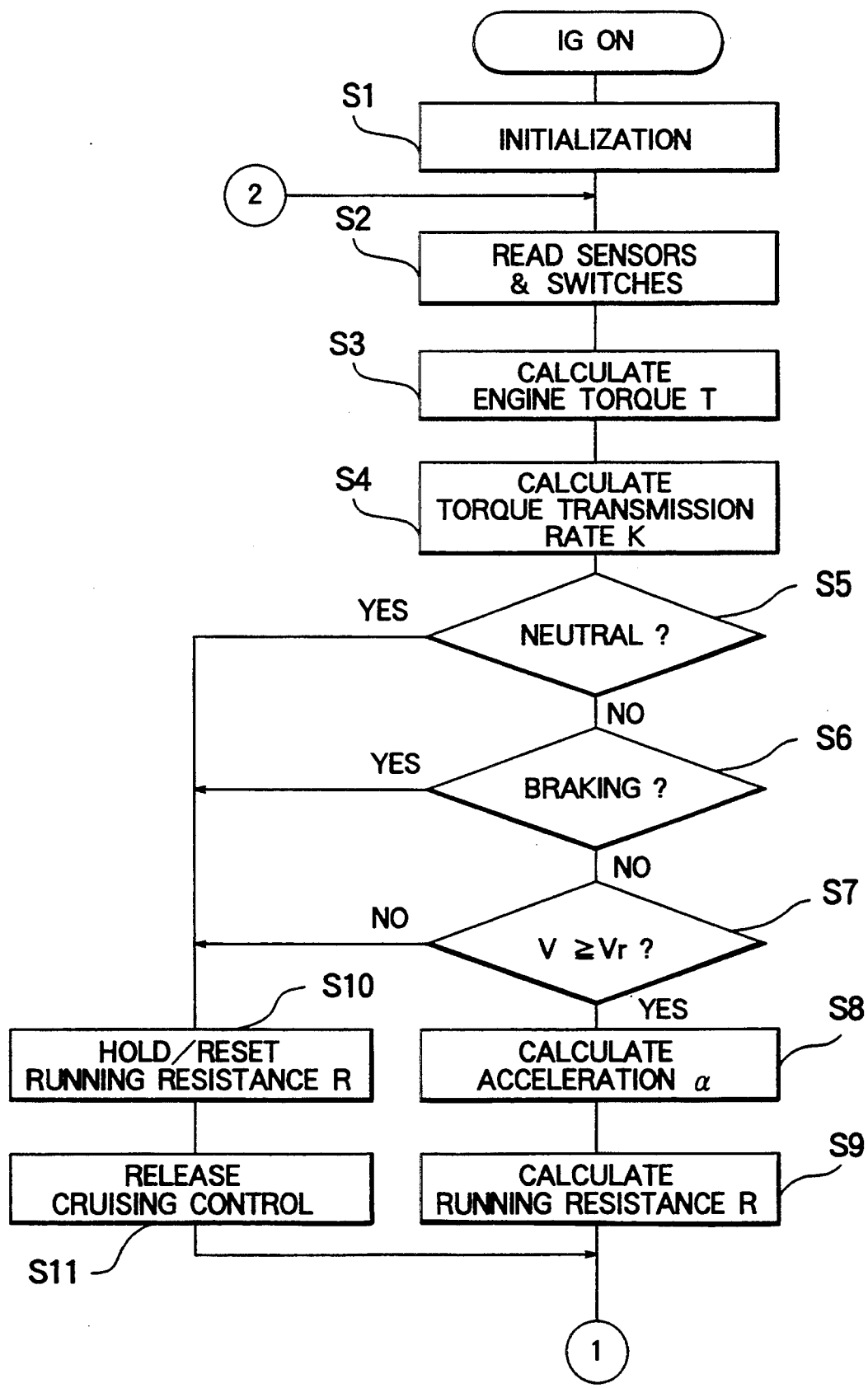
FIG. 10 is a flowchart showing a part of the routine for performing the cruising control according to the first embodiment of this invention.
Figure 11:
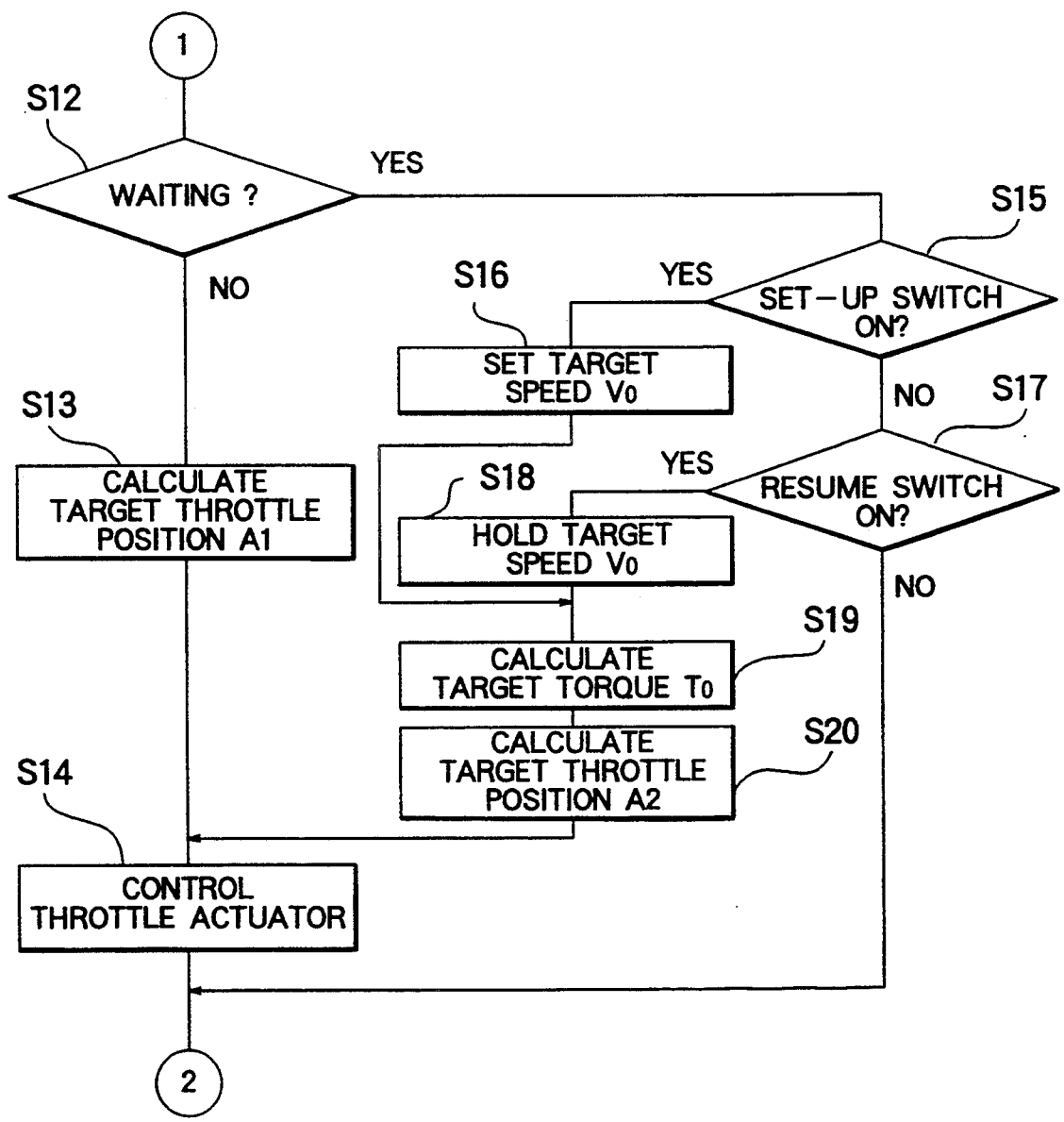
FIG. 11 shows the remaining part of the routine of FIG. 10.

FIGS. 10 and 11 show the routine for performing the cruising control according to the first embodiment of this invention. The routine is started when the ignition switch is turned on. When the routine starts, the RAM for storing temporary values used in various calculations are cleared and the various parameters are initialized at step S1. For example, the running resistance R is reset to the predetermined value for driving upon flat land. After step S1, the steps step S2 et seqq are repeated. The engine control unit 17, the running resistance detector unit 18 and the cruising control unit 19 of FIG. 1, whose functional structures are shown in FIG. 2, may be implemented as a program stored in the memory of a microcomputer. Then, the routine is executed by the microcomputer in response to the various sensors and switches, etc.

At step S2, output signals from various sensors and switches are read in. Namely, the microcomputer reads in the following signals: (1) the analog outputs from the cylinder pressure sensor 14, the throttle position sensor 9, the air flow sensor 11, the water temperature sensor 15, the vehicle weight sensor 5, etc., which are converted into digital signals by A/D converters (not shown); (2) the pulse signals from the engine rpm sensor 4, the crankshaft angle sensor 16, the torque converter turbine rpm sensor 3, the vehicle speed sensor 1, etc., whose waveforms are shaped by waveform shaper circuits (not shown); and (3) the digital signals from the clutch detector means MS, the brake switch 6, the control switches 20 (including the set-up switch and the resume switch), the coast switch, etc. Other exterior information may also be read in by the microcomputer.

Next at step S3, the output torque T of the engine is calculated in accordance with one of the methods shown in FIGS. 3a through 3d. At step S4, the gear ratio G is determined and the torque transmission rate K is calculated on the basis of the rpm Re of the engine, the rpm Rt of the turbine of the torque converter 100, looking up the table showing the relation of FIG. 8.

Next at step S5, it is judged whether or not the transmission is in the neutral (or the clutch of the vehicle is disengaged). If the judgement is affirmative at step S5, the execution proceeds to step S10. Otherwise, the execution proceeds to step S6. At step S6, on the basis of the braking signal from the brake switch 6, it is judged whether or not the brake pedal is kicked. If the brake pedal is not kicked, the execution proceeds to step S7. If the brake pedal is kicked, the execution proceeds to step S10, since, due to the braking resistance, the running resistance R under the normal condition cannot be detected if the brake pedal is kicked. At step S7, it is judged whether or not the vehicle speed V is above a predetermined reference vehicle speed Vr (e.g., 40 km/h). If the judgement is affirmative at step S7 (i.e., $V \geq Vr$), the execution proceeds to step S8. Otherwise, the execution branches to step S10. Thus, when the vehicle speed V is below the predetermined vehicle speed Vr (i.e., $V < Vr$), it is avoided (1) that the current vehicle speed V be set as the target speed V0, and (2) that the cruising control be performed.

At step S8, the vehicle acceleration $\alpha$ is calculated from the difference between the current vehicle speed V(i) and previous vehicle speed V(i−1). Next at step S9, the running resistance R is calculated from the output torque T of the engine, the gear ratio G (including the final reduction gear ratio), the vehicle acceleration α, the vehicle weight W (including the rotational weight corresponding to the moments of the rotating parts of the vehicle), and the radius r of the road wheels of the vehicle, in accordance with the following equation (9):

$$R = T \cdot G \cdot (1/r) - \alpha \cdot W \tag{9}$$

The vehicle weight W in equation (9) includes the rotational weight corresponding to the moments of the rotating parts of the vehicle, and is expressed as following:

$$W = W0 + W' \tag{10}$$

where the first term W0 represents the stationary weight of the vehicle and the second term W' represents the rotational weight corresponding to the moments of the rotational parts of the vehicle.

In equation (10), the accurate value of the rotational weight W' depends on the gear ratio G. Thus, it is preferred that the value of the rotational weight W' be modified in equation (10) in accordance with the value of the gear ratio G.

In the case of the vehicle having an automatic transmission 101 provided with a torque converter 100 shown in FIG. 1, the gear ratio G in the above equation (9) should be replaced by the following value G', taking into consideration the torque transmission rate K:

$$G' = G \times K \tag{11}$$

Equation (11) gives the composite gear ratio G' of the torque converter 100 and the transmission 101.

The execution proceeds to step S10 from steps S5 through S7 when the running resistance R cannot be calculated. Thus, at step S10, the running resistance R is held at the previous value, or reset to the initial value for the flat land driving condition. At step S11, the cruising control is released and the adjustment of the throttle valve 8 is returned to the control of the acceleration pedal. Thus, the clutch connecting the throttle actuator 10 to the throttle valve 8 is disengaged, and the throttle position (opening degree) A may be returned to the zero position.

Next, the part of the routine executed subsequent to step S9 is described by reference to FIG. 11.

At step S12, it is judged whether or not the execution is in the waiting state for the cruising control. The judgment is affirmative at step S12 if the cruising control is currently not effected. If the vehicle is currently under the cruising control, the judgment at step S12 is negative, and the execution proceeds to step S13. On the other hand, if the judgement is affirmative at step S12, the execution proceeds to step S15. At step S13, the first target throttle position calculator means 21 determines the target throttle position (opening degree) A1 as described above, on the basis of the target vehicle speed V0 (which is set during the previous execution cycle of the routine), and the current vehicle speed V (which is detected at step S2 during the current execution cycle of the routine). Next, the execution proceeds to step S14, where the throttle actuator 10 is controlled such that the throttle position (opening degree) A is adjusted to the target throttle position (opening degree) A1.

On the other hand, if the judgement is affirmative at step S12, the execution proceeds to step S15, where it is judged whether or not the set-up switch of the control switches 20 is turned on. If the judgement is affirmative at step S15 (i.e., if the set-up switch is ON), the execution proceeds to step S16. Otherwise, the execution proceeds to step S17. At step S16, the current vehicle speed V is set as the target vehicle speed V0, and the execution proceeds to step S16. At step S17, it is judged whether or not the resume switch is turned on. If the judgement is affirmative at step S17 (i.e., the resume switch is ON), the execution proceeds to step S18. Otherwise, the execution returns step S2 to repeat the routine of FIGS. 10 and 11. At step S18, the old target vehicle speed V0 which has been set during a previous execution cycle of the run is set again (i.e., held) as the new target vehicle speed V0, and the execution proceeds to step S19. At step S19, on the basis of the running resistance R determined at the previous step S9, the target torque calculator means M6 calculates the target torque T0, which is needed for obtaining the target cruising speed V0 during the transient state immediately after the set-up switch or the resume switch is set (turned on). Next at step S20, the second target throttle position calculator means 22 calculates the target throttle position (opening degree) A2 on the basis of the target torque T0. Next, the execution proceeds to step S14, where the throttle control means 23 controls the throttle actuator 10 such that the throttle valve 8 is adjusted to the target throttle position (opening degree) A2. After step S14, the execution returns step S2 to repeat the routine of FIGS. 10 and 11.

As described above, the running resistance R is determined before the constant speed cruising control is performed, and, during the transient state immediately after the target speed V0 is set, or immediately after the resume switch is turned on, the second target throttle position (opening degree) A2 is determined directly from the running resistance R (steps S19 and S20 in FIG. 11). Thus, the throttle position (opening degree) A is adjusted almost instantly to the target throttle position (opening degree) A2 which is necessary for keeping the vehicle speed V at the target vehicle speed V0 during the transient period. As a result, the drop of the vehicle speed V, etc., immediately after the set-up or resuming of the cruising control, can be effectively avoided.

Figure 12:
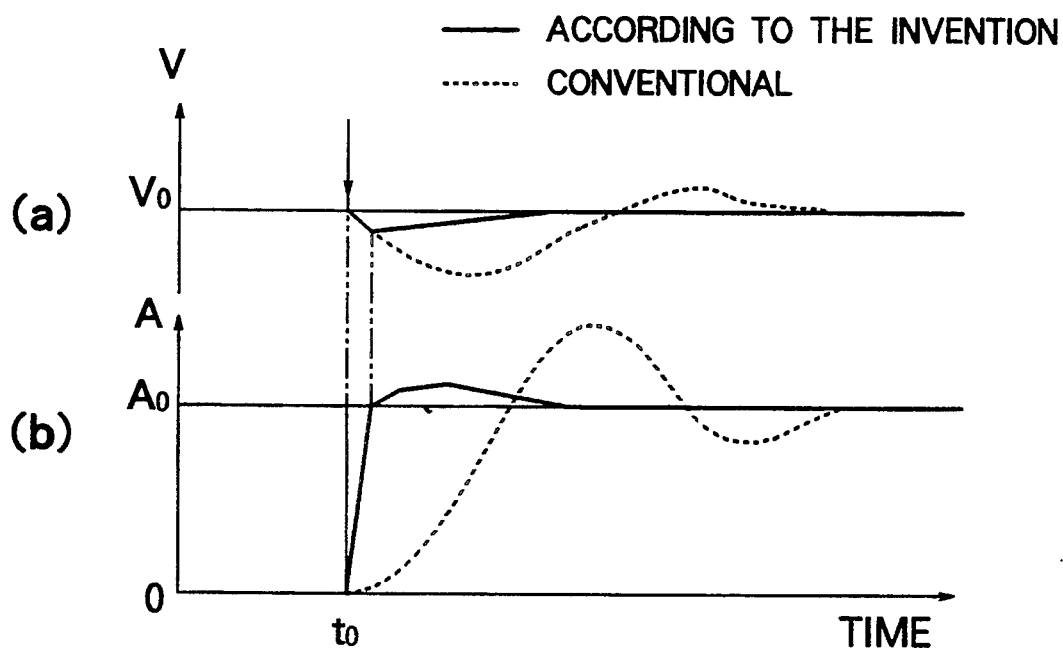
FIG. 12 compares the variations of the vehicle speed V and the throttle position (opening degree) A for the cases where.

FIG. 12 compares the variations of the vehicle speed V and the throttle position (opening degree) A for the cases where:

(1) the transient state control based on the value of running resistance R is performed according to this invention (the solid curves), and (2) no transient state control is performed (the dotted curves). According to this invention, immediately after the set-up switch is set at t0, the throttle position (opening degree) A rises directly from zero to the level A0 needed for maintaining the target vehicle speed V0. The level A0 is substantially equal to the target throttle position (opening degree) A2 calculated by the second target throttle position calculator means 22. Thus, after a small drop, the vehicle speed V returns to the target speed V0. The cruising speed is thus stabilized within a short time, and the variation of the acceleration of the vehicle is suppressed. The driver is thus freed from the uncomfortable feelings experienced during the transient period. FIG. 12 shows the transient period immediately after the set-up switch is turned on. The same advantage is obtained when the cruising control is resumed by means of the resume switch.

Referring next FIGS. 14 through 17 of the drawings, a second embodiment of this invention is described.

FIG. 14 is a block diagram showing alternative functional structure of the running resistance detector unit and the cruising control unit of FIG. 1 according to the second embodiment of this invention. The structure is similar to that shown in FIG. 2, except that:

(1) the control gain calculator means M7 is used instead of the target torque calculator means M6 of FIG. 2, and (2) the target throttle position calculator means consists of a single unit 21a instead of being divided into the first target throttle position calculator means 21 and the second target throttle position calculator means 22.

The control gain calculator means M7 calculates the control gain GE corresponding to the running resistance R. FIG. 15 is a characteristic diagram showing the variations of the integral control gain GEI and the proportional control gain GEP, used in the second embodiment, with respect to the running resistance R of the vehicle. The control gain GE includes two components: the integral control gain GEI (the component corresponding to the deviation $\Delta V$ of the current vehicle speed V from the target speed V0 as given by equation (6) above) and the proportional control gain GEP (the component corresponding to the difference $\Delta V(i)$ between the current vehicle speed V(i) and the previous vehicle speed V(i−1) just one predetermined period before the current period, as given by the above equation (7) above). The integral control gain GEI and the proportional control gain GEP are functions of the running resistance R, and, as shown in FIG. 15, the values thereof increase as the value of the running resistance R increases. A table showing the values of the integral control gain GEI and the proportional control gain GEP as dependent upon the value of the running resistance R is stored in the memory (ROM) forming part of the control gain calculator means M7. Upon receiving the value of the running resistance R from the running resistance detector unit 18, the control gain calculator means M7 looks up the table and determines the control gain GE (i.e., the integral control gain GEI and the proportional control gain GEP).

On the basis of the current vehicle speed V, the target speed V0, and the control gain GE (the integral control gain GEI and the proportional control gain GEP), the target throttle position calculator means 21a determines the target throttle position (opening degree) A0 in accordance with the proportional plus integral control method as follows.

First, the deviation $\Delta V$ of the actual vehicle speed V from the target speed V0 for each predetermined period (i.e., the integral or accumulated error $\epsilon I$) is calculated by the equation (6):

$$\Delta V = \epsilon I = V0 - V \qquad (6)$$

Further, the difference $\Delta V(i)$ between the current vehicle speed V(i) and the previous vehicle speed V(i−1) just one predetermined period before the current period (namely, the proportional error $\epsilon P$) is determined by the equation (7):

$$\Delta V(i) = \epsilon P = V(i-1) - V(i) \qquad (7)$$

Next, using the integral error $\epsilon I$ and the proportional error $\epsilon P$ obtained from the above equations (6) and (7), respectively, the variation of the throttle position $\Delta A$ needed for adjusting the the vehicle speed V to the target speed V0 is determined by the following equation (12):

$$\Delta A = GEI \times \epsilon I + GEP \times \epsilon P \qquad (12)$$

The target throttle position calculator means 21a adds the variation of the throttle position $\Delta A$ obtained from equation (12) to the current throttle position (opening degree) A detected by the throttle position sensor 9, thereby obtaining the current target throttle position (opening degree) A0.

The target throttle position calculator means 21a, the control gain calculator means M7, and the throttle control means 23 constitute the cruising control unit 19. The parts other than the control gain calculator means M7 and the target throttle position calculator means 21a are similar to the corresponding parts of the first embodiment.

FIGS. 16 and 17 show the routine for performing the cruising control according to the second embodiment of the invention. The part of the routine shown in FIG. 16 is the same as that of FIG. 10. Following the step S9 or the S11, the part of the routine shown in FIG. 17 is performed as follows.

At step S12, it is judged whether or not the execution is in the waiting state for the cruising control. The judgment is affirmative at step S12 if the cruising control is currently not effected. If the vehicle is currently under the cruising control, the judgment at step S12 is negative, and the execution proceeds to step S13. On the other hand, if the judgement is affirmative at step S12, the execution proceeds to step S16.

At step S13, the control gain calculator means M7 determines the control gain GE (the integral control gain GEI and the proportional control gain GEP) corresponding to the running resistance R obtained at the previous step S9, by looking up the table showing the relations of FIG. 15. Next at step S14, on the basis of the deviation $\Delta V$ of the current vehicle speed V detected at step S2 from the target speed V0, the target throttle position calculator means 21a calculates the target throttle position (opening degree) A0 using the above equation (12). Next, the execution proceeds to step S15, where the throttle actuator 10 is controlled such that the throttle position (opening degree) A is adjusted to the target throttle position (opening degree) A0.

On the other hand, if the judgement is affirmative at step S12, the execution proceeds to step S16, where it is judged whether or not the set-up switch of the control switches 20 is turned on. If the judgement is affirmative at step S16 (i.e., if the set-up switch is ON), the execution proceeds to step S17. Otherwise, the execution proceeds to step S18. At step S17, the current vehicle speed V is set as the target vehicle speed V0, and the execution returns to step S2 to repeat the routine of FIGS. 16 and 17. At step S18, it is judged whether or not the resume switch is turned on. If the judgement is affirmative at step S18 (i.e., the resume switch is ON), the execution proceeds to step S19. Otherwise, the execution returns step S2 to repeat the routine of FIGS. 16 and 17. At step S19, the old target vehicle speed V0 which has been set during a previous execution cycle of the routine is set again (i.e., held) as the new target vehicle speed V0, and the execution returns to step S2 to repeat the routine of FIGS. 16 and 17. In the case where the judgment at step S16 or S18 is affirmative, and the judgment at step S12 in the next execution cycle becomes negative, and the steps S13 through S15 are performed.

Thus, according to the second embodiment, the optimum control gain GE corresponding to the running resistance R is calculated at step S13, and the target throttle position (opening degree) A0 is determined at step S14 on the basis of the optimum control gain GE corresponding to the running resistance R. The throttle actuator 10 is controlled in accordance with the target throttle position (opening degree) A0 at step S15. Thus, the problems of the conventional automatic cruising speed controller, namely, (1) the delay of response under the uphill driving condition, and
(2) the hunting of the vehicle speed under the downhill driving condition, can effectively be resolved. Namely, when the vehicle is driving uphill and the running resistance R is great, a greater value of the control gain GE corresponding to the running resistance R is selected in accordance with the relations shown in FIG. 15. Thus, a correspondingly greater value of the target throttle position (opening degree) A0 is set for the same magnitude of the deviation $\Delta V$ of the current vehicle speed V from the target speed V0, such that the response speed of the automatic cruising speed controller is improved. On the other hand, when the vehicle is driving downhill and the running resistance R is small, a smaller value of the control gain GE corresponding to the running resistance R is selected. Thus, a correspondingly smaller value of the target throttle position (opening degree) A0 is set for the same magnitude of the deviation $\Delta V$, such that the hunting of the vehicle speed is suppressed.

What is claimed is:

1. An automatic cruising speed controller for performing a constant speed cruising control of an automotive vehicle including an engine, an output torque of which is controlled by an adjustment of a throttle position of a throttle valve, said automatic cruising speed controller comprising:

vehicle speed detector means for detecting a current speed of said vehicle;

target vehicle speed set-up means for setting a target vehicle speed;

first target throttle position calculator means, coupled to said vehicle speed detector means and said target vehicle speed set-up means, for determining a first target throttle position for attaining said target vehicle speed during a steady state period, on the basis of said vehicle speed detected by said vehicle speed detector means and said target vehicle speed set by said target vehicle speed set-up means;

running resistance detector means for determining a running resistance of said vehicle;

engine set-up condition detector means for detecting an engine set-up condition including a gear ratio of a transmission inserted between an output shaft of said engine and road wheels of said vehicle;

target torque determination means, coupled to said running resistance detector means and said engine set-up condition detector means, for determining a target torque of said engine necessary for attaining said target vehicle speed during a transient period immediately after said constant speed cruising control of said vehicle is commenced or resumed, on the basis of said running resistance determined by said running resistance detector means and said gear ratio detected by said engine set-up condition detector means;

second target throttle position calculator means, coupled to said target torque determination means, for determining a second target throttle position for attaining said target vehicle speed during said transient period immediately after said constant speed cruising control of said vehicle is commenced or resumed, on the basis of said target torque determined by said target torque determination means; and throttle control means, coupled to said first and second target throttle position calculator means, for adjusting said throttle position to said second target throttle position during said transient period immediately after .said constant speed cruising control of said vehicle is commenced or resumed, and to said first target throttle position during a steady state after said transient period.

2. An automatic cruising speed controller as claimed in claim 1, wherein said running resistance detector means comprises:

engine torque detector means for detecting an output torque of said engine of said vehicle;

acceleration detector means, coupled to said vehicle speed detector means, for determining an acceleration of said vehicle from successive values of vehicle speed detected by said vehicle speed detector means; and calculation means, coupled to said engine torque detector means, said acceleration detector means, and said engine set-up condition detector means, for calculating a running resistance on the basis of said engine torque, said acceleration, and said engine set-up condition.

3. An automatic cruising speed controller as claimed in claim 1, wherein said constant speed cruising control is commenced or resumed in response to an operation of a control switch.

4. An automatic cruising speed controller as claimed in claim 3, wherein said constant speed cruising control is commenced in response to an operation of a set-up switch and resumed in response to an operation of a resume switch.

5. An automatic cruising speed controller as claimed in claim 1, wherein said first target throttle position calculator means calculates said first target throttle position on the basis of said detected vehicle speed and said target vehicle speed in accordance with a proportional plus integral control method.

6. An automatic cruising speed controller as claimed in claim 4, wherein said target vehicle speed set-up means determines as said target vehicle speed said vehicle speed detected by said vehicle speed detector means upon said operation of said set-up switch.

7. An automatic cruising speed controller as claimed in claim 1, wherein said throttle control means comprises:

throttle position sensor means for detecting said throttle position; and throttle actuator means for adjusting said throttle position;

said throttle control means controlling said throttle actuator means such that a throttle position detected by said throttle position sensor means agrees with said second target throttle position during said transient period and with said first target throttle position during said steady state period.

8. An automatic cruising speed controller for performing a constant speed cruising control of an automotive vehicle including an engine, an output torque of which is controlled by an adjustment of a throttle position of a throttle valve, said automatic cruising speed controller comprising:

vehicle speed detector means for detecting a current speed of said vehicle;

target vehicle speed set-up means for setting a target vehicle speed;

running resistance detector means for determining a running resistance of said vehicle;

control gain calculation means, coupled to said running resistance detector means, for determining a proportional control gain add an integral control gain of said throttle position corresponding to said running resistance determined by said running resistance detector means;

target throttle position calculator means, coupled to said vehicle speed detector means, said target vehicle speed set-up means, and said control gain calculation means, for determining a target throttle position for attaining said target vehicle speed on the basis of said vehicle speed detected by said vehicle speed detector means, said target vehicle speed set by said target vehicle speed set-up means, and said proportional and integral control gains determined by said control gain calculation means, in accordance with a proportional plus integral control method; and throttle control means, coupled to said target throttle position calculator means, for adjusting said throttle position to said target throttle position.

9. An automatic cruising speed controller as claimed in claim 8, wherein said running resistance detector means comprises:

engine torque detector means for detecting an output torque of said engine of said vehicle;

acceleration detector means, coupled to said vehicle speed detector means, for determining an acceleration of said vehicle from successive values of vehicle speed detected by said vehicle speed detector means;

engine set-up condition detector means for detecting an engine condition including a gear ratio of an transmission coupled to an output shaft of said engine; and calculation means, coupled to said engine torque detector means, said acceleration detector means, and said engine set-up condition detector means, for calculating a running resistance on the basis of said engine torque, said acceleration, and said engine set-up condition.

10. An automatic cruising speed controller as claimed in claim 8, wherein said constant speed cruising control is commenced or resumed in response to an operation of a control switch.

11. An automatic cruising speed controller as claimed in claim 10, wherein said constant speed cruising control is commenced in response to an operation of a set-up switch and resumed in response to an operation of a resume switch.

12. An automatic cruising speed controller as claimed in claim 11, wherein said target vehicle speed set-up means determines as said target vehicle speed said vehicle speed detected by said vehicle speed detector means upon said operation of said set-up switch.

13. An automatic cruising speed controller as claimed in claim 8, wherein said throttle control means comprises:

throttle position sensor means for detecting said throttle position; and throttle actuator means for adjusting said throttle position;

said throttle control means controlling said throttle actuator means such that a throttle position detected by said throttle position sensor means agrees with said target throttle position.

* * * * *